United States Patent
Samra

(10) Patent No.: US 7,129,961 B1
(45) Date of Patent: Oct. 31, 2006

(54) SYSTEM AND METHOD FOR DYNAMIC AUTOCROPPING OF IMAGES

(75) Inventor: Sukendeep Samra, Venice, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1084 days.

(21) Appl. No.: 09/665,721

(22) Filed: Sep. 18, 2000

(51) Int. Cl.
G09G 5/00 (2006.01)

(52) U.S. Cl. ............... 345/620; 345/629; 345/631

(58) Field of Classification Search ........ 345/629, 345/630, 631, 589, 591, 592, 434, 620, 216; 358/487, 450, 443, 447, 448, 452, 471, 506, 358/515, 517
See application file for complete search history.

(56) References Cited

U.S. PATENT DOCUMENTS

| | | | | |
|---|---|---|---|---|
| 4,482,924 A | * | 11/1984 | Brownstein | 358/302 |
| 4,831,447 A | * | 5/1989 | Lake, Jr. | 348/597 |
| 5,729,673 A | * | 3/1998 | Cooper et al. | 345/427 |
| 5,880,858 A | * | 3/1999 | Jin | 358/487 |
| 6,340,971 B1 | | 1/2002 | Janse et al. | |

* cited by examiner

Primary Examiner—Matthew C. Bella
Assistant Examiner—Tam Tran
(74) Attorney, Agent, or Firm—Blakely, Sokoloff, Taylor & Zafman LLP

(57) ABSTRACT

A system and method for automatically reading all images from all sequences of images from a specified location, automatically cropping each of the images to produce active region data for the current image, and automatically designating key frames in the sequences of images. In one embodiment, a stand-alone program that achieves these tasks produces an output file comprised of active region data for key frames of all sequences of images. In such an embodiment, the output file serves as a script or control file which a compositing program runs to initially process sequences of images. In another embodiment, these automatic tasks are achieved via a plug-in module to a compositing program such that the plug-in module is run before performing other tasks. The automation of these three formerly manual tasks increases the efficiency of compositing programs by providing automatically pre-processed sequences of images from which to start the compositing process. In addition, autocropping allows for better use of system resources and improves system performance by causing the system to only load smaller, autocropped images of key frames.

44 Claims, 4 Drawing Sheets

SYSTEM AND METHOD FOR DYNAMIC AUTOCROPPING OF IMAGES

FIELD OF THE INVENTION

The present invention relates to the field of computer graphics, compositing images, and adding special effects to images.

BACKGROUND

Color images are defined by many pixels. Pixels are the building blocks of an image and are often defined by a three component description comprised of red, green and blue components commonly referred to as RGB. A fourth component called alpha is often added resulting in an RGBA description of pixels. Alpha refers to the opacity (or transparency) of a pixel. The standard alpha component is an eight bit value providing 256 levels of opacity from 0–255, where 0 is fully transparent and 255 is full opacity amounting to non-transparency. Alpha is popularly used in compositing images for feature films and other video presentations.

Compositing images is the combining of more than one image to create a single new image. Compositing of images can be performed with a single image frame, such as photograph or a sequence of images, such as film or movies. For example an image of a fish could be combined with the image of a grassy field so that the fish is swimming in the grass. Alpha is used to relate the fish image to the grass. For example, if the fish is placed on the grass and the grass is completely opaque (alpha=255), no grass will be seen through the fish. If the fish has an alpha of 0, the grass image will seep through the fish so that the fish cannot be seen. Alpha values in between produce differing degrees of a grassy fish. A fish swimming through the grass could be created by compositing a single image frame of a grassy field and a sequence of images created by filming a fish swimming in the ocean. Alternatively, two (or more) sequences of images can be composited, such as a sequence of images of a wind blown grassy field and a sequence of images of a school of fish swimming through the ocean. In addition, the school of fish and/or the grassy field can also have been created in an animation program. Moreover, the ocean area surrounding filmed fish could be obliterated by giving the surroundings (that is, everything but the fish) an opacity of 0, setting the surroundings to have no opacity.

Compositing also includes the techniques of enhancing a sequence of images captured on film by adding special effects, computer generated images, still images, animation and other filmed images to a motion picture. Compositing is used to enhance a sequence of film thus creating a new sequence of images. Special effects, computer generated images, still images, animation and other filmed images are combined with film by compositing to create a new sequence of images.

One popular use for compositing includes the use of blue screen image sequences. In what is known as "blue screening," an actor is filmed in front of a blue (or green) screen. The alpha values of the background in such an image can be automatically set to transparent, having an opacity of 0. The blue screened sequence of images is then composited with other sequences of images. For example, a street vendor selling watches shot against a blue screen could be composited with a city street scene with English language signs behind him to create one sequence of image, while the same vendor sequence could be composited with Spanish language signs at one of Spain's costa del sol beach resorts to create a second sequence of images. More striking effects such as compositing sequences of images to show an actor riding a prehistoric dinosaur can be achieved in a similar manner.

SUMMARY

The present invention provides a system and method for automatically reading a plurality of images from sequences of images from a specified location, automatically cropping each of the images to produce active region data for the current image, and automatically designating key frames in the sequences of images. In one embodiment, a stand-alone program that achieves these tasks produces an output file comprised of active region data for key frames of all sequences of images. In such an embodiment, the output file serves as a script or control file which a compositing program runs to initially process sequences of images. In another embodiment, these automatic tasks are achieved via a plug-in module to a compositing program such that the plug-in module is run before performing other tasks. The automation of these three formerly manual tasks increases the efficiency of compositing programs by providing automatically pre-processed sequences of images from which to start the compositing process. In addition, autocropping allows for better use of system resources and improves system performance by causing the system to only load smaller, autocropped images of key frames.

BRIEF DESCRIPTION OF THE DRAWINGS

The features and advantages of the present invention will become apparent from the following detailed description of the present invention in which.

DETAILED DESCRIPTION

When creating a movie, sequences of images are traditionally shot with a camera, developed and edited to create a finished product. Special effects have been added to films in many ways. More recently, with the availability of high powered computers, computer software programs are increasingly used to assist in the creation of movies, television shows, and other video presentations whether originating from animation or live action camera shots. To clarify various qualities of the present invention, the phrase video presentation includes sequences of images such as film, movies, animation, features, shorts, and the like created by digital film or video footage, digitized film or video input, computer generated images, hand drawn images, still images such as photographs and the compositing of each of these including the adding of effects. In addition, the phrase sequence of images includes any sequence of images created by filming, videotaping, still photography, computer generated images such as animation, hand drawn images such as animation, and the like.

Computer programs used in manipulating sequences of images for producing video presentations are compositing programs commonly referred to as effects software or digital effects software. Examples of such programs include Media Illusion® available from the Softimage™ division of Avid Technology, Inc., One Park West, Tewksbury, Mass. 01876; Chalice, available from Silicon Grail Corporation, 710 Seward Street, Hollywood, Calif. 90038, and the Maya and Studio series of programs, available from Alias|Wavefront®, 210 King Street East, Toronto, Ontario, Canada M5A 1J7.

When starting to use a compositing program, sequences of images stored in a variety of formats are input. Common formats of digital images used in producing video presentations include Alias|Wavefront's RLA format (more information is available from Alias|Wavefront®, 210 King Street East, Toronto,. Ontario, Canada M5A 1J7), Silicon Graphic's SGI format (more information is available from Silicon Graphics, Inc., 1600 Amphitheatre Parkway, Mountain View, Calif. 94043), and Kodak's Cineon digital film format (more information is available from Eastman Kodak Company, Rochester, N.Y.).

Figure 1:
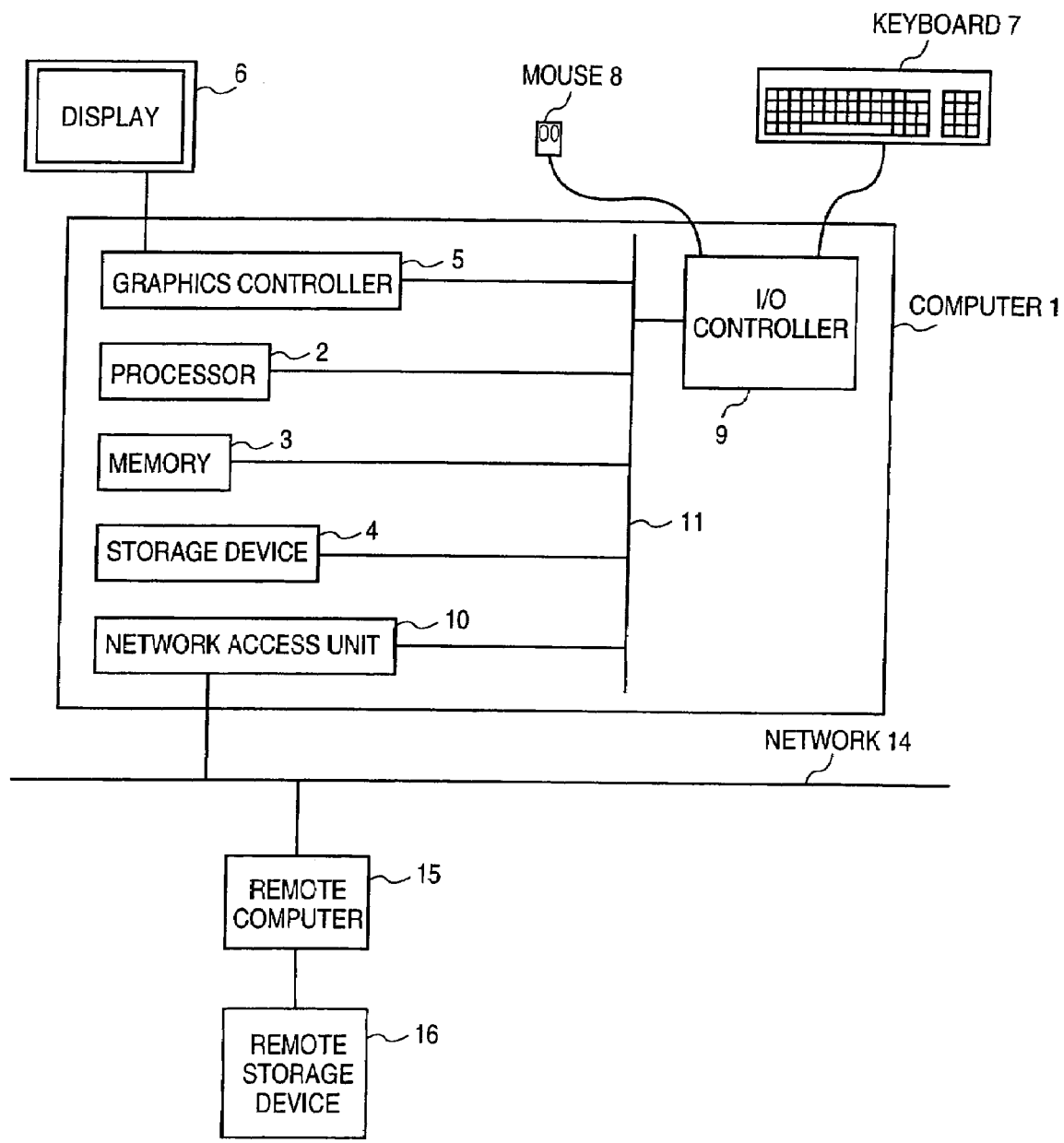
FIG. 1 depicts a system and environment in which the method of the present invention is executed.

FIG. 1 depicts a system and environment in which the method of the present invention is executed. A compositing program is executed on computer 1. The computer comprises a processor 2 to execute the compositing program. Processor 2 may be any computer processor known to those skilled in the art. When executing the compositing program, the processor utilizes memory 3. Memory 3 may be any form of volatile random access memory (RAM) known to those skilled in the art. The compositing program accesses sequences of images from storage device 4. Storage device 4 may be a writeable disk drive known to those skilled in the art such as, for example, a hard disk or a readable and writeable compact disk (CDRW). When the compositing program reads an image or sequence of images from the disk drive, the processor may communicate instructions to graphics controller 5 to display the images on display device 6. Graphics controller 6 may be any graphics controller known to those skilled in the art, and display device 6 may be any display monitor known to those skilled in the art, including, but not limited to, a cathode ray tube (CRT) display monitor, or thin film transistor (TFT) display screen. A user accesses the compositing program running on computer 1 via any computer input device known to those skilled in the art, such as, for example keyboard 7 and mouse 8 which are coupled to the processor by an input/output (I/O) controller 9.

To access images not stored on computer 1, computer 1 includes a network access unit 10 which allows the compositing program to communicate over network 14 to remote computer 15 and access images stored on remote storage device 16. Network 14 may be a local area network (LAN), wide area network (WAN), or any other kind of network known to those skilled in the art. Remote computer 15 may be any kind of computer known to those skilled in the art, including, but not limited to, personal computers, specialty graphics workstations, and servers. Remote storage device 16 may be any readable storage medium known to those skilled in the art such as, for example, hard disk drives and CDRWs. Although only one remote computer and one network are depicted, multiple remote computers over multiple networks may be connected to computer 1. Processor 2, memory 3, storage device 4, graphics controller 5, I/O controller 9 and network access unit 10, are coupled to one another via and communicate with one another over bus 11.

Bus 11 may be any bus known to those skilled in the art. Although only one bus is depicted, multiple buses may be used in computer 1. In addition, other internal components known to those skilled in the art (not depicted) or multiple instances of depicted components may be included in computer 1.

The initial steps taken when using compositing programs typically include a user manually designating each sequence of images that will be combined. The user then often manually crops images and manually selects what is known in the art as key frames, single images of a sequence of images that meet certain criteria. Key frames are image frames of a sequence of images which are important to the sequence of images and include the first image of a sequence of images, and image frames which are substantially different from the prior image frame. Key frames are discussed in more detail below.

Figure 2:
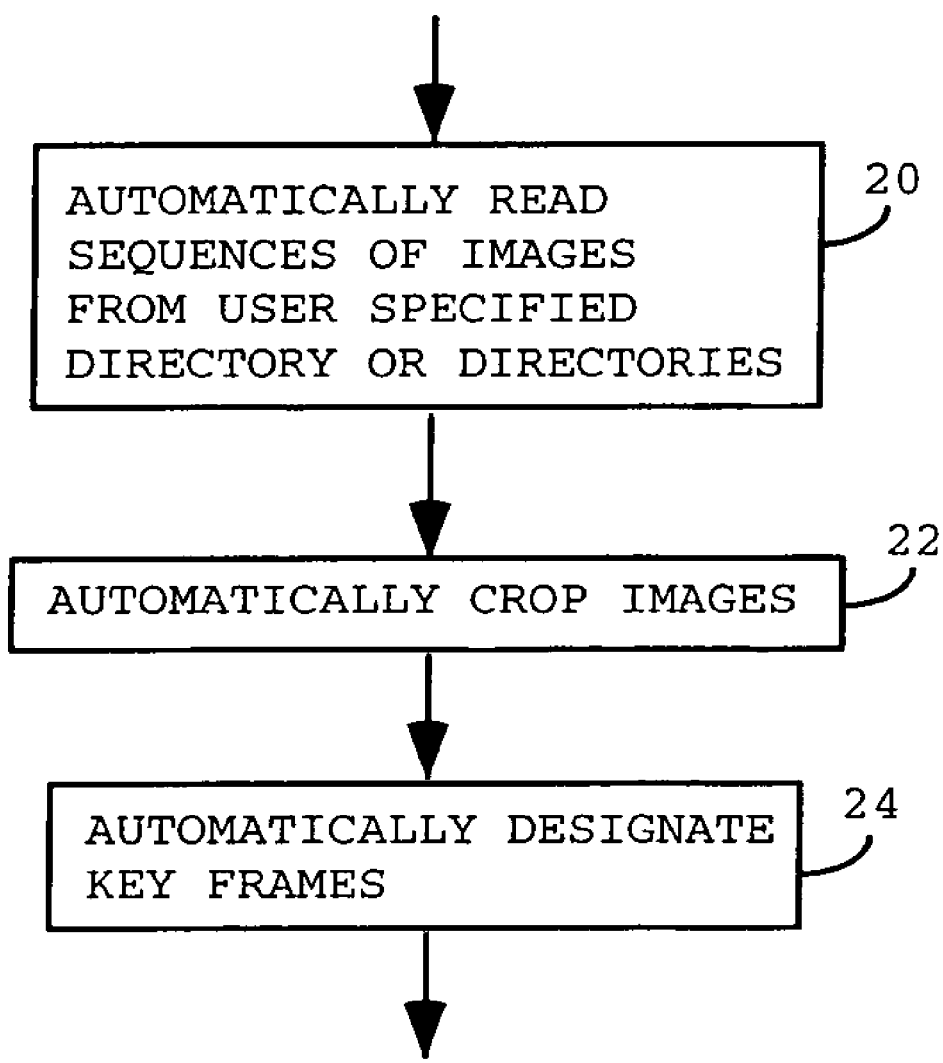
FIG. 2 depicts the flow of initial steps automatically performed according to the method of the present invention when starting to create a video presentation with compositing software applications.

FIG. 2 depicts the flow of initial steps automatically performed according to one embodiment of the method of the present invention when starting to create a video presentation with a compositing software application. The present invention provides a method for automatically reading images from sequences of images from a specified directory or directories as shown in block 20, automatically cropping each of the images as shown in block 22, and automatically designating key frames in the sequences of images as shown in block 24. The automation of these three formerly manual tasks increases the efficiency of users of compositing programs by providing automatically pre-processed sequences of images from which to start. In addition, autocropping allows for better use of system resources and improves system performance by causing the system to only load autocropped images of key frames. This increased performance is achieved by the system loading fewer images, only key frames rather than all image frames of a sequence of images, and only loading the autocropped key frames which are smaller than full images. That is, as a cropped image is smaller, comprises a smaller area, it is defined by less data than a full image.

Software written to automatically read sequences of images, automatically crop the images, and automatically designate key frames may be implemented a variety of ways. In one embodiment, the software is implemented as a plug-in or a module within a compositing program. In an alternate embodiment, the software may be implemented as a stand-alone pre-processing tool or utility program. In one embodiment, the automatic cropping and other steps can be included as a plug-in or module with a compositing program such that the plug-in is executed upon start up of the compositing program or is executed as a first step when using the compositing program. In another embodiment, the automatic cropping and other steps can be achieved via a separate stand-alone program which is run in advance of starting a compositing program such that the stand-alone program creates a script or control file which the compositing program runs to initially process sequences of images. In such an embodiment, the stand-alone program functions as a pre-processing program that is run on sequences of images before a user begins using the features of the compositing program.

Figure 3:
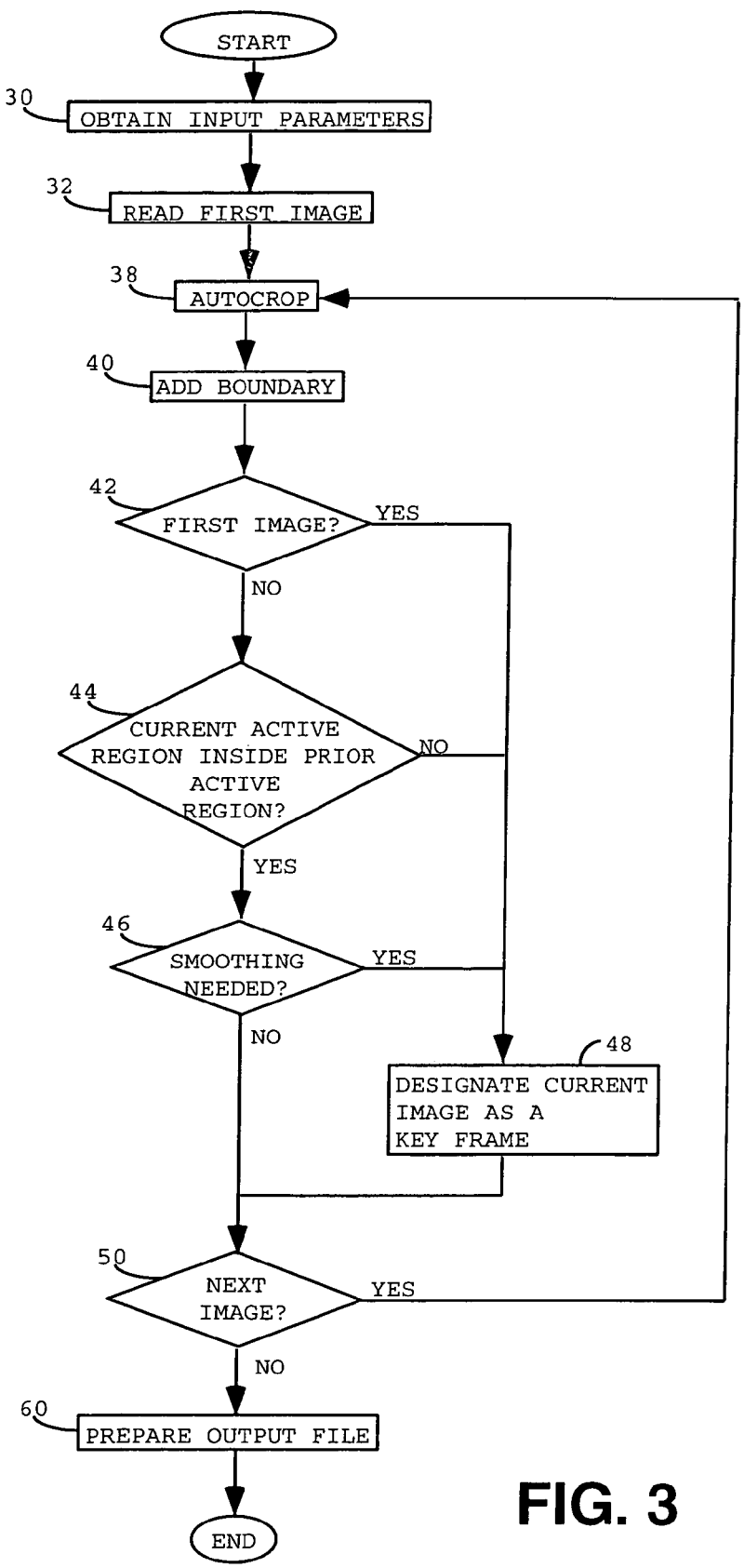
FIG. 3 depicts a more detailed view of the flow of one embodiment of the initial steps automatically performed according to the method of the present invention when starting to create a video presentation with a compositing software application.

FIG. 3 depicts a more detailed view of the flow of initial steps automatically performed according to one embodiment of the method of the present invention when starting to create a video presentation with a compositing software application. In one embodiment, to automatically read sequences of images, automatically crop the images, and automatically designate key frames, a stand-alone pre-processing program is evoked via a command line interface taking various parameters as input. In one embodiment, parameters include boundary, a smoothness factor, input file location, output file location. (Boundary and smoothness factor are discussed in more detail below.) The input parameters are obtained as shown in step 30. The first image of the first sequence of images in the specified directory is then read and set as the current image as shown in block 32. The current image is then autocropped, as shown in block 38, producing active region data for the current image. In one embodiment, during autocropping, only cropping data, that is, active region data, is produced; in this embodiment, no changes are made to the current image during autocropping. Further details of one embodiment of autocropping are set forth below with regard to FIGS. 4a and 4b.

After autocropping the current image, a user specified boundary, if any, is added to the active region of the current image, as shown in block 40. As with autocropping, no changes are made to the current image; only the active region data is updated. In another embodiment, a default or machine preset boundary, or no boundary is added to the active region. In one embodiment, the pre-processing software allows the user to set the boundary to between 0 and 20 pixels, and defaults to a boundary of 10 pixels if no boundary value is specified.

A check is then made to determine whether the current image is a first image of the current sequence of images, as shown in block 42. If the current image is a first image, the current image is designated as a key frame, as shown in block 48. If the current image is not a first image, a check is made to determine whether the active region of the current image is inside the prior image's active region, as shown in block 44. If not, the current image is designated as a key frame, as shown in block 48. If the active region of the current image is inside the prior image's active region, a comparison is then made to determine if smoothing is needed, as shown in block 46.

Smoothing relates to how different the image frames are from their neighboring image frames in a particular sequence of image frames. More specifically, when a sequence of images is displayed over time, the resulting viewed images can appear smooth or disjointed depending on how similar the image frames comprising the sequence are to one another. The smoothing factor is a value representing the threshold by which one frame can differ from its neighbors. In one embodiment, smoothing is needed when the difference in area (in square pixels) between the active region of the current image and the active region of the prior image is greater than the smoothing factor value input by the user. If smoothing is needed, then the current image is designated a key frame, as shown in block 48. In another embodiment, a default or machine preset smoothing factor, or no smoothing factor is provided. In one embodiment, the pre-processing software allows the user to set the smoothing factor to between 0 and 20 pixels, and defaults to a smoothing factor of 5 pixels if no smoothing factor value is specified.

If the current image is a first image, if the active region of the current image is not inside the prior image's active region, or if smoothing is needed, the current frame is designated as a key frame, as shown in block 48. If the current image is a key frame, the active region data for the current frame is stored so that it is later included in the output file when pre-processing has completed. The output file only contains active region data for images designated as key frames.

If smoothing is not needed or after the current image has been designated a key frame, a check is made as to whether there are any further images; that is, a check is made as to whether there is a next image, as shown in block 50. As part of this checking, if there is a next image, the next image is read. Reading the next image includes, storing the current image and its active region data as the prior image and active region of the prior image, and reading the next image of the current sequence of images and setting it to be the current image. As this point, if there are no further images in the current sequence of images, the next sequence of images is obtained from the user specified directory. If there is a next image, autocropping is performed at block 38, and the flow continues as previously described. If there are no further images in the current sequence of images and there are no further sequences of images, then an output file is prepared containing data that defines the active regions for all of the images of all of the sequences of images that were designated as key frames, as shown in block 60. The output file can then be used as an input file to a compositing program.

Figures 4A, 4B:
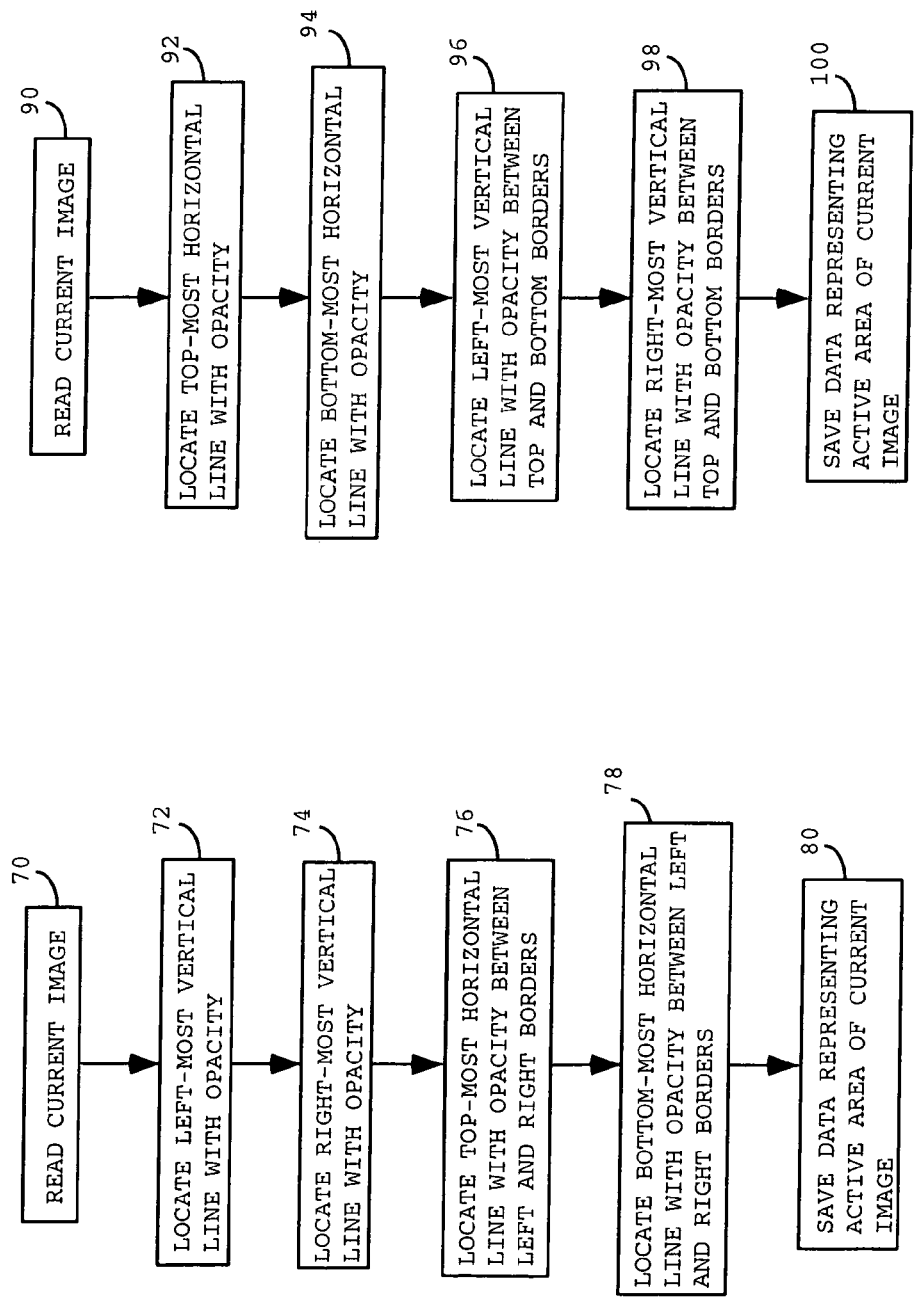
FIGS. 4a and 4b depict two methods of embodiments of autocropping.

FIGS. 4a and 4b depict two methods of autocropping. Generally, autocropping determines the active region of a current image frame. In one embodiment, an active region is a region surrounded by pixels that are fully transparent or pixels that have no opacity. In other embodiments, an active region is a region surrounded by pixels that are outside a certain opacity threshold that may be either pre-defined by the system or user defined. In yet other embodiments, a determination of opacity for a pixel is made by analyzing pixels surrounding the current pixel to create an average which is then compared to a threshold opacity. In such embodiments, a function that returns 0 when the pixel is within the threshold opacity and 1 when the pixel is outside the threshold opacity may be used. Such a function would, in some embodiments take into consideration the opacity values of pixels neighboring the current pixel. Traditionally, opacity is an 8 bit value, but in other embodiments, opacity may be an alpha component that is a 16 bit, 32 bit, 64 bit or any other bit size variable the particular hardware system supports. In addition, in other embodiments, it follows that opacity as measured by an alpha value may increase in range from 0 to 255 to a range correlating to the bit size used to represent alpha values, such as, for example, 0 to 65,536 for a 16 bit representation.

FIG. 4a depicts one method of autocropping an image frame. After the current image is read, as shown in block 70, the left-most vertical line of the current image with opacity is located, as shown in block 72. In one embodiment, this is achieved by starting at pixel 0,0, the origin of the image, and proceeding up and down vertical lines to the right until a line with opacity is found such that the prior line has no opacity. The x coordinate of the left-most vertical line with opacity defines the left border of the active region of the current image. Similarly, the right-most vertical line of the current image with opacity is located, as shown in block 74. In one embodiment, this is achieved by starting at the pixel corresponding to the horizontal and vertical resolution of the image (e.g., pixel 800, 600 for an image frame with 800×600 resolution) and proceeding down and up vertical lines to the left (no further than the left border) until a line with opacity is found such that the prior line has no opacity. The x coordinate of the right-most vertical line with opacity defines the right border of the active region of the current image.

The top and bottom borders of the active region of the current image are then located. The top-most horizontal line of the current image with opacity is located, as shown in block 76. In one embodiment, this is achieved by starting at the pixel with the x coordinate corresponding to the left border and the y coordinate corresponding to the image vertical resolution (e.g., pixel left border, 600 for an image frame with 800×600 resolution) and proceeding left and right across horizontal lines between the left border and right border toward the bottom until a line with opacity is found such that the prior line has no opacity. Processing pixels between the left border and right border increases computational efficiency as pixels outside the borders are not examined. The y coordinate of the top-most horizontal line with opacity defines the top border of the active region of the current image.

The bottom-most horizontal line of the current image with opacity is then located, as shown in block 78. In one embodiment, this is achieved by starting at the pixel with the x coordinate corresponding to the left border and the y coordinate corresponding to 0 (i.e., pixel left border, 0) and proceeding left and right across horizontal lines between the left border and right border toward the top border until a line with opacity is found such that the prior line has no opacity. As above, processing pixels between the left border and right border increases computational efficiency. The y coordinate of the bottom-most horizontal line with opacity defines the bottom border of the active region of the current image.

Data representing the active region of the current image is then stored, as shown in block 80. The data stored are the left border, right border, top border and bottom borders of the active region of the current image.

FIG. 4*b* depicts another method of autocropping an image frame. After the current image is read, as shown in block 90, the top-most horizontal line of the current image with opacity is located, as shown in block 92. In one embodiment, this is achieved by starting at the pixel with an x coordinate corresponding to 0 and a y coordinate corresponding to the vertical resolution of the image (e.g., 0, 600 for an image frame with 800×600 resolution) and proceeding right and left across horizontal lines toward the bottom until a line with opacity is found such that the prior line has no opacity. The y coordinate of the top-most horizontal line with opacity defines the top border of the active region of the current image. Similarly, the bottom-most horizontal line of the current image with opacity is located, as shown in block 94. In one embodiment, this is achieved by starting at the pixel corresponding to coordinates 0, 0 and proceeding right and left across horizontal lines toward the top (no further than the top border) until a line with opacity is found such that the prior line has no opacity. The y coordinate of the bottom-most horizontal line with opacity defines the bottom border of the active region of the current image.

The left and right borders of the active region of the current image are then located. The left-most vertical line of the current image with opacity is located, as shown in block 96. In one embodiment, this is achieved by starting at the pixel with x coordinate corresponding to 0 and y coordinate corresponding to the bottom border (i.e., pixel at 0, bottom border) and proceeding up and down through vertical lines between the bottom border and top border to the right until a line with opacity is found such that the prior line has no opacity. Processing pixels between the bottom border and top border increases computational efficiency as pixels outside the borders are not examined. The x coordinate of the left-most vertical line with opacity defines the left border of the active region of the current image.

The right-most vertical line of the current image with opacity is then located, as shown in block 98. In one embodiment, this is achieved by starting at the pixel with the x coordinate corresponding to the horizontal resolution of the image and the y coordinate corresponding to the bottom border (e.g., pixel 800, bottom border for an image frame with 800×600 resolution) and proceeding up and down through vertical lines between the bottom border and top border toward the left border until a line with opacity is found such that the prior line has no opacity. As above, processing pixels between the top border and bottom border increases computational efficiency. The x coordinate of the right-most horizontal line with opacity defines the right border of the active region of the current image.

Data representing the active region of the current image is then stored, as shown in block 100. The data stored are the left border, right border, top border and bottom borders of the active region of the current image.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method comprising:
   preparing autocrop data for each image of a sequence of images, each image comprising a frame of video data; and
   storing autocrop data for each key frame of the sequence of images;
   wherein preparing autocrop data comprises determining the active region of a current image of the sequence of images;
   wherein determining the active region comprises selecting a portion of the current image as the active region of the current image such that all pixels outside the active region have no opacity;
   wherein selecting a portion comprises locating a first vertical line of pixels with at least one pixel having non-zero opacity closest to the origin of the current image, locating a second vertical line of pixels with at least one pixel having non-zero opacity furthest from the origin of the current image, locating a first horizontal line of pixels with at least one pixel having non-zero opacity closest to the origin of the current image, locating a second horizontal line of pixels with at least one pixel having non-zero opacity furthest from the origin of the current image, and storing data specifying the active region of the current image.

2. The method of claim 1 wherein
   locating the first vertical line and locating the second vertical line are performed before locating the first horizontal line and locating the second horizontal line; and
   locating the first horizontal line and locating the second horizontal line each comprise examining pixels between the first vertical line and the second vertical line.

3. The method of claim 1 wherein
   locating the first horizontal line and locating the second horizontal line are performed before locating the first vertical line and locating the second vertical line; and
   locating the first vertical line and locating the second vertical line each comprise examining pixels between the first horizontal line and the second horizontal line.

4. The method of claim 1 wherein storing data specifying the active region of the current image comprises:

storing the x coordinate of the first vertical line, the x coordinate of the second vertical line, the y coordinate of the first horizontal line, and the y coordinate of the second horizontal line.

5. The method of claim 1 further comprising:
determining which images of the sequences of images are key frames.

6. A method comprising:
preparing autocrop data for each image of a sequence of images, each image comprising a frame of video data;
storing autocrop data for each key frame of the sequence of images;
determining which images of the sequence of images are key frames, wherein determining comprises:
determining whether the current image is the first frame of the sequence of images, and, if so, designating the current image as a key frame;
determining whether the active region of the current image is outside the active region of a prior image, and, if so, designating the current image as a key frame; and
determining whether smoothing is needed, and, if so, designating the current image as a key frame.

7. The method of claim 6 wherein determining whether smoothing is needed comprises:
calculating the difference in area between the active region of the current image and the active region of the prior image; and
comparing the difference in area with a smoothing factor.

8. The method of claim 7 wherein the smoothing factor is a numerical value set by a user.

9. The method of claim 6 wherein the active region is a portion of any image such that all pixels outside the active region of the image have no opacity.

10. The method of claim 6 further comprising:
adding a boundary to the active region of the current image.

11. The method of claim 10 wherein the boundary is a numerical value set by a user.

12. A machine readable medium having stored thereon instructions which when executed by a processor cause the machine to perform operations comprising:
preparing autocrop data for each image of a sequence of images, each image comprising a frame of video data; and
storing autocrop data for each key frame of the sequence of images;
wherein preparing autocrop data causes the machine to perform operations comprising determining the active region of a current image of the sequence of images;
wherein determining the active region data causes the machine to perform operations comprising selecting a portion of the current image as the active region of the current image such that all pixels outside the active region have no opacity;
wherein selecting a portion causes the machine to perform operations comprising locating a first vertical line of pixels with at least one pixel having non-zero opacity closest to the origin of the current image, locating a second vertical line of pixels with at least one pixel having non-zero opacity furthest from the origin of the current image, locating a first horizontal line of pixels with at least one pixel having non-zero opacity closest to the origin of the current image, locating a second horizontal line of pixels with at least one pixel having non-zero opacity furthest from the origin of the current image, and storing data specifying the active region of the current image.

13. The machine readable medium of claim 12 wherein:
locating the first vertical line and locating the second vertical line are performed before locating the first horizontal line and locating the second horizontal line; and
locating the first horizontal line and locating the second horizontal line each comprise examining pixels between the first vertical line and the second vertical line.

14. The machine readable medium of claim 12 wherein:
locating the first horizontal line and locating the second horizontal line are performed before locating the first vertical line and locating the second vertical line; and
locating the first vertical line and locating the second vertical line each comprise examining pixels between the first horizontal line and the second horizontal line.

15. The machine readable medium of claim 12 wherein storing data specifying the active region of the current image causes the machine to perform operations comprising:
storing the x coordinate of the first vertical line, the x coordinate of the second vertical line, the y coordinate of the first horizontal line, and the y coordinate of the second horizontal line.

16. The machine readable medium of claim 12 having stored thereon further instructions which when executed by the processor cause the machine to perform further operations comprising:
determining which images of the sequences of images are key frames.

17. The machine readable medium of claim 12 having stored thereon further instructions which when executed by the processor cause the machine to perform further operations comprising:
adding a boundary to the active region of the current image.

18. A machine readable medium having stored thereon instructions which when executed by a processor cause the machine to perform operations comprising:
preparing autocrop data for each image of a sequence of images, each image comprising a frame of video data; and
storing autocrop data for each key frame of the sequence of images;
determining which images of the sequences of image are key frames, wherein determining causes the machine to perform operations comprising:
determining whether the current image is the first frame of the sequence of images, and, if so, designating the current image as a key frame;
determining whether the active region of the current image is outside the active region of a prior image, and, if so, designating the current image as a key frame; and
determining whether smoothing is needed, and, if so, designating the current image as a key frame.

19. The machine readable medium of claim 18 wherein determining whether smoothing is needed causes the machine to perform operations comprising:
calculating the difference in area between the active region of the current image and the active region of the prior image; and
comparing the difference in area with a smoothing factor.

20. The machine readable medium of claim 19 wherein the smoothing factor is a numerical value set by a user.

21. The machine readable medium of claim 18 wherein the active region is a portion of any image such that all pixels outside the active region of the image have no opacity.

22. The machine readable medium of claim 10 wherein the boundary is a numerical value set by a user.

23. A system comprising:
a processor coupled to a bus;
a memory coupled to the bus;
a storage device coupled to the bus, the storage device having stored thereon instructions which when executed by the processor cause the system to perform operations comprising:
preparing autocrop data for each image of a sequence of images, each image comprising a frame of video data; and
storing autocrop data for each key frame of the sequence of images on the storage device;
wherein preparing autocrop data causes the system to perform operations comprising determining the active region of a current image of the sequence of images;
wherein determining the active region data causes the system to perform operations comprising selecting a portion of the current image as the active region of the current image such that all pixels outside the active region have no opacity;
wherein selecting a portion causes the system to perform operations comprising locating a first vertical line of pixels with at least one pixel having non-zero opacity closest to the origin of the current image, locating a second vertical line of pixels with at least one pixel having non-zero opacity furthest from the origin of the current image, locating a first horizontal line of pixels with at least one pixel having non-zero opacity closest to the origin of the current image, locating a second horizontal line of pixels with at least one pixel having non-zero opacity furthest from the origin of the current image, and storing data specifying the active region of the current image.

24. The system of claim 23 wherein:
locating the first vertical line and locating the second vertical line are performed before locating the first horizontal line and locating the second horizontal line; and
locating the first horizontal line and locating the second horizontal line each comprise examining pixels between the first vertical line and the second vertical line.

25. The system of claim 23 wherein:
locating the first horizontal line and locating the second horizontal line are performed before locating the first vertical line and locating the second vertical line; and
locating the first vertical line and locating the second vertical line each comprise examining pixels between the first horizontal line and the second horizontal line.

26. The system of claim 23 wherein storing data specifying the active region of the current image causes the system to perform operations comprising:
storing the x coordinate of the first vertical line, the x coordinate of the second vertical line, the y coordinate of the first horizontal line, and the y coordinate of the second horizontal line.

27. The system of claim 23 having further instructions which when executed by the processor cause the system to perform further operations comprising:
determining which images of the sequences of images are key frames.

28. The system of claim 23 wherein reading at least one sequence of images comprises:
transferring at least one sequence of images from the storage device to the memory.

29. The system of claim 23 wherein reading at least one sequence of images comprises:
transferring at least one sequence of images from a remote storage device via a network.

30. A system comprising:
a processor coupled to a bus;
a memory coupled to the bus;
a storage device coupled to the bus, the storage device having stored thereon instructions which when executed by the processor cause the system to perform operations comprising:
preparing autocrop data for each image of a sequence of images, each image comprising a frame of video data; and
storing autocrop data for each key frame of the sequence of images on the storage device;
determining which images of the sequence of images are key frames, wherein determining causes the system to perform operations comprising:
determining whether the current image is the first frame of the sequence of images, and, if so, designating the current image as a key frame;
determining whether the active region of the current image is outside the active region of a prior image, and, if so, designating the current image as a key frame; and
determining whether smoothing is needed, and, if so, designating the current image as a key frame.

31. The system of claim 30 wherein determining whether smoothing is needed causes the system to perform operations comprising:
calculating the difference in area between the active region of the current image and the active region of the prior image; and
comparing the difference in area with a smoothing factor.

32. The system of claim 30 wherein the active region is a portion of any image such that all pixels outside the active region of the image have no opacity.

33. The system of claim 32 having stored thereon further instructions which when executed by the processor cause the system to perform further operations comprising:
adding a boundary to the active region of the current image.

34. An apparatus comprising:
means for preparing autocrop data for each image of a sequence of images, each image comprising a frame of video data;
means for storing autocrop data for each key frame of the sequences of images;
wherein the means for preparing autocrop data comprises means for determining the active region of a current image of the sequence of images;
wherein the means for determining the active region comprises means for selecting a portion of the current image as the active region of the current image such that all pixels outside the active region have no opacity;
wherein the means for selecting a portion comprises means for locating a first vertical line of pixels with at least one pixel having non-zero opacity closest to the origin of the current image, means for locating a second vertical line of pixels with at least one pixel having non-zero opacity furthest from the origin of the current image, means for locating a first horizontal line of pixels with at least one pixel having non-zero opacity closest to the origin of the current image, means for locating a second horizontal line of pixels with at least one pixel having non-zero opacity furthest from the origin of the current image, and means for storing data specifying the active region of the current image.

35. The apparatus of claim 34 wherein
- the means for locating the first vertical line and the means for locating the second vertical line process the current image before the means for locating the first horizontal line and the means for locating the second horizontal line; and
- the means for locating the first horizontal line and the means for locating the second horizontal line each comprise means for examining pixels between the first vertical line and the second vertical line.

36. The apparatus of claim 34 wherein
- the means for locating the first horizontal line and the means for locating the second horizontal line process the current image before the means for locating the first vertical line and the means for locating the second vertical line; and
- the means for locating the first vertical line and the means for locating the second vertical line each comprise means for examining pixels between the first horizontal line and the second horizontal line.

37. The apparatus of claim 34 wherein the means for storing data specifying the active region of the current image comprises:
- means for storing the x coordinate of the first vertical line, the x coordinate of the second vertical line, the y coordinate of the first horizontal line, and the y coordinate of the second horizontal line.

38. The apparatus of claim 34 further comprising:
- means for determining which images of the sequence of images are key frames.

39. The apparatus of claim 34 further comprising:
- means for adding a boundary to the active region of the current image.

40. The apparatus of claim 39 wherein the boundary is a numerical value set by a user.

41. An apparatus comprising:
- means for preparing autocrop data for each image of a sequence of images, each image comprising a frame of video data;
- means for storing autocrop data for each key frame of the sequences of images;
- means for determining which images of the sequence of images are key frames, wherein the means for determining comprises:
  - means for determining whether the current image is the first frame of the sequence of images, and, if so, designating the current image as a key frame;
  - means for determining whether the active region of the current image is outside the active region of a prior image, and, if so, designating the current image as a key frame; and
- means for determining whether smoothing is needed, and, if so, designating the current image as a key frame.

42. The apparatus of claim 41 wherein the means for determining whether smoothing is needed comprises:
- means for calculating the difference in area between the active region of the current image and the active region of the prior image; and
- means for comparing the difference in area with a smoothing factor.

43. The apparatus of claim 42 wherein the smoothing factor is a numerical value set by a user.

44. The apparatus of claim 41 wherein the active region is a portion of any image such that all pixels outside the active region of the image have no opacity.

* * * * *